(12) United States Patent
Woods

(10) Patent No.: US 8,302,934 B1
(45) Date of Patent: Nov. 6, 2012

(54) VEHICLE STOP DEVICE

(76) Inventor: Steven L. Woods, Mesa, AZ (US)

( * ) Notice: Subject to any disclaimer, the term of this patent is extended or adjusted under 35 U.S.C. 154(b) by 559 days.

(21) Appl. No.: 12/497,631

(22) Filed: Jul. 3, 2009

(51) Int. Cl.
*B62B 3/00* (2006.01)
(52) U.S. Cl. .................. 254/2 R; 254/93 HP; 254/8 B
(58) Field of Classification Search .................. 254/2 B, 254/8 B, 93 H, 93 HP, 93 R
See application file for complete search history.

(56) References Cited

U.S. PATENT DOCUMENTS

| | | | | |
|---|---|---|---|---|
| 5,911,408 A * | 6/1999 | Berends et al. | ............... | 254/2 B |
| 6,416,039 B1 * | 7/2002 | Pietrusynski | ................. | 254/8 B |
| 6,929,249 B1 * | 8/2005 | Kim | ......................... | 254/93 HP |
| 7,070,167 B1 * | 7/2006 | Bacon et al. | ............... | 254/93 HP |
| 7,367,546 B1 * | 5/2008 | Rodriguez | ..................... | 254/126 |

\* cited by examiner

*Primary Examiner* — Lee D Wilson

(57) ABSTRACT

A vehicle stop device includes a plurality of wheels, a generally flat base carried by the plurality of wheels, a lift system carried by the base and a generally flat deck carried by the lift system.

6 Claims, 3 Drawing Sheets

VEHICLE STOP DEVICE

FIELD OF THE INVENTION

The present disclosure relates to devices for stopping fleeing vehicles. More particularly, the present disclosure relates to a vehicle stop device which may be used to stop a fleeing vehicle by raising the vehicle above a road surface.

BACKGROUND OF THE INVENTION

High-speed car chases occur each year throughout the United States and the world. One common method of stopping a fleeing vehicle in a car chase includes placement of tire-puncturing devices across the roadway ahead of the fleeing vehicle. When the fleeing vehicle drives over the tire-puncturing devices, the devices puncture the wheels of the vehicle. However, a vehicle with punctured tires is dangerous to operate, particularly at high vehicle speeds.

Therefore, a vehicle stop device which may be used to stop a fleeing vehicle by raising the vehicle above a road surface without puncturing the tires of the vehicle is needed.

SUMMARY OF THE INVENTION

The present disclosure is generally directed to a vehicle stop device which may be used to stop a fleeing vehicle by raising the vehicle above a road surface. An illustrative embodiment of the vehicle stop device includes a plurality of wheels, a generally flat base carried by the plurality of wheels, a lift system carried by the base and a generally flat deck carried by the lift system.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
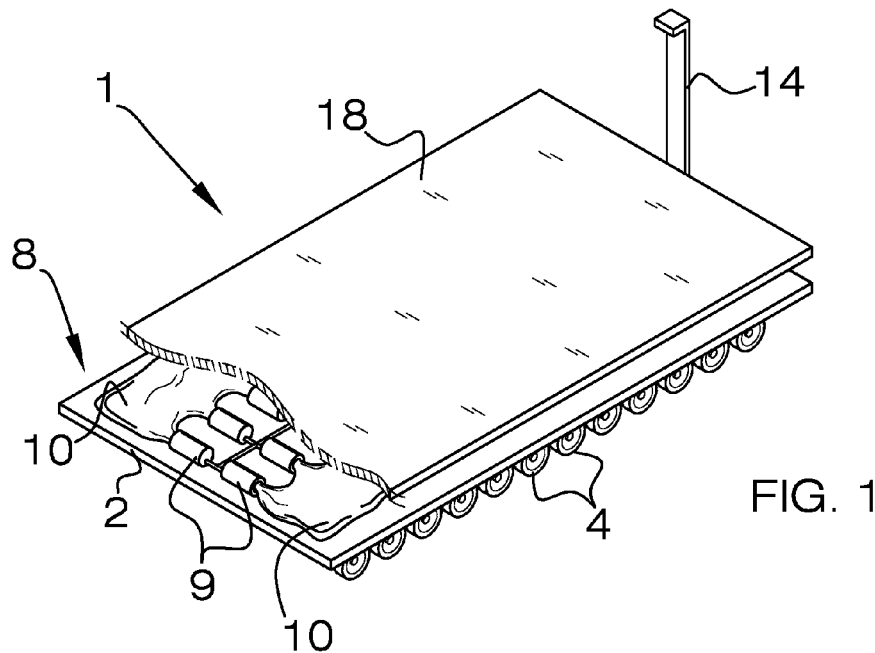
FIG. 1 is a perspective view, partially in section, of an illustrative embodiment of the vehicle stop device, shown in a lowered configuration.
Figure 2:
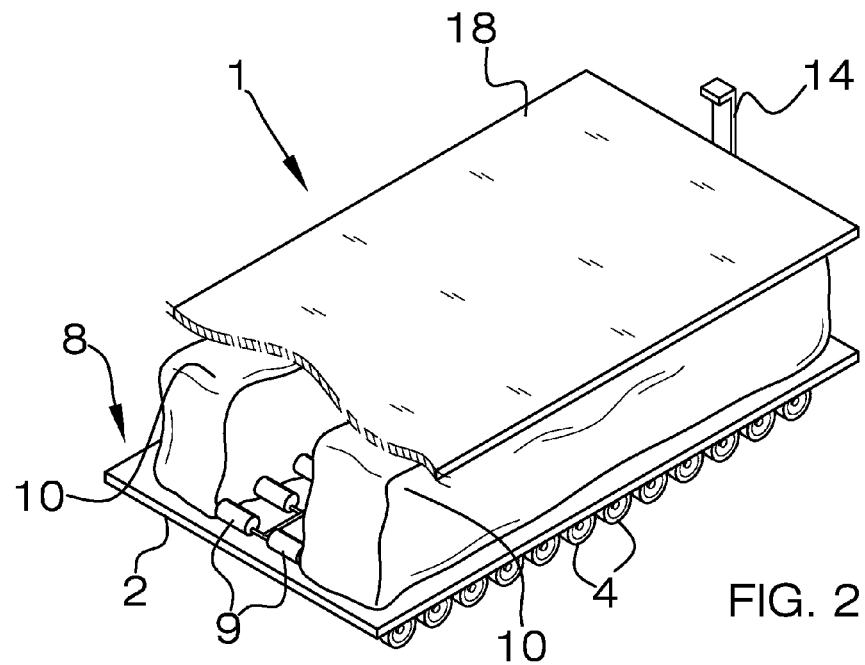
FIG. 2 is a perspective view, partially in section, of an illustrative embodiment of the vehicle stop device, shown in an extended, vehicle-raising configuration.
Figure 3:
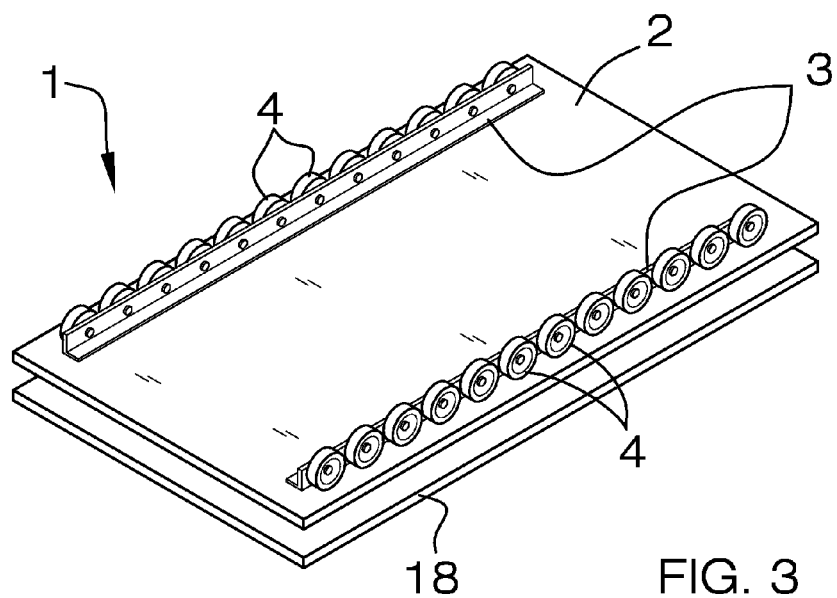
FIG. 3 is an inverted perspective view of an illustrative embodiment of the vehicle stop device.

Referring initially to FIGS. 1-5, an illustrative embodiment of the vehicle stop device is generally indicated by reference numeral 1. The vehicle stop device 1 includes a generally flat base 2 which may have a generally elongated, rectangular configuration and may be steel. Multiple wheels 4 may be provided on the base 2. The wheels 4 may be attached to the base 2 according to any suitable technique which is known by those skilled in the art. As shown in FIG. 3, in some embodiments at least one wheel rail 3 may be provided on the base 2 and multiple, adjacent wheels 4 provided on the wheel rail 3. A pair of wheel rails 3 may be provided on the base 2 in generally parallel, spaced-apart relationship with respect to each other and the wheels 4 may be provided on each wheel rail 3.

A deck lift system 8 may be provided on the base 2. A generally flat deck 18 may be provided on the lift system 8. In some embodiments, the deck 18 may be generally elongated and rectangular and may be steel, plywood or other material.

Figure 4:
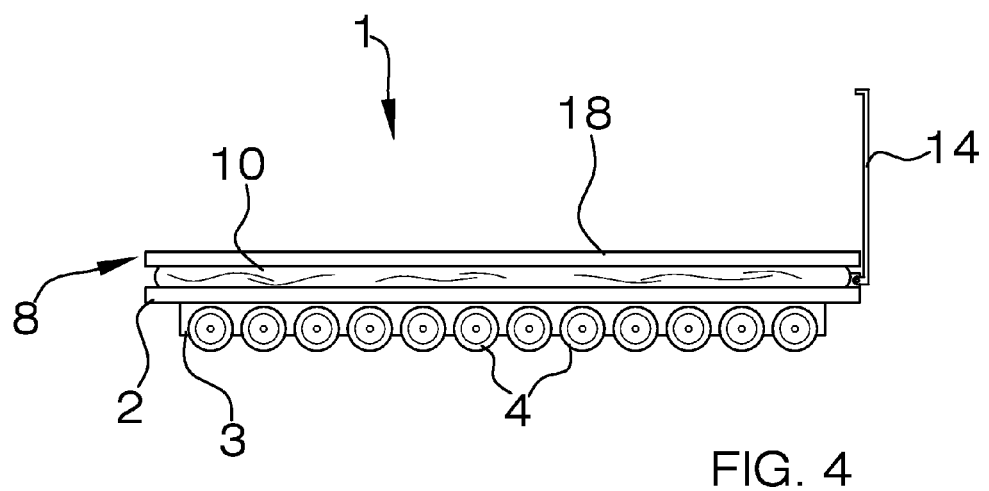
FIG. 4 is a side view of an illustrative embodiment of the vehicle stop device, shown in the lowered configuration.
Figure 5:
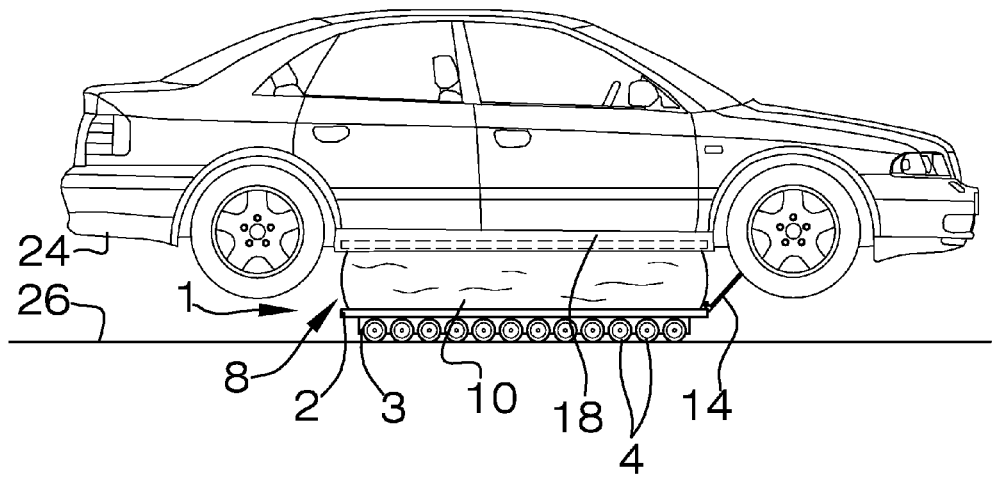
FIG. 5 is a side view of an illustrative embodiment of the vehicle stop device, shown in the extended configuration and raising a vehicle.

As shown in FIGS. 1 and 2, in some embodiments, the deck lift system 8 may include a pneumatic lift system having at least one air canister 9 provided on the base 2. Each air canister 9 contains a supply of compressed air. In some embodiments, multiple air canisters 9 may be provided on the base 2. At least one air bag 10 may be provided on the base 2 in pneumatic communication with the air canister 9 or air canisters 9. As further shown in FIGS. 1 and 2, in some embodiments, two sets of air canisters 9 may be provided on the base 2 generally at the center thereof. A pair of air bags 10 may be disposed in pneumatic communication with the respective sets of air canisters 9 generally adjacent to the respective outer edges of the base 2. Each air bag 10 is normally deployed in a flat, collapsed configuration, as shown in FIGS. 1 and 4, in which the air bag 10 is devoid of air and the deck 18 lies flat on the base 2. Each air bag 10 is adapted to receive a supply of compressed air from each air canister 9 to inflate and raise the deck 18 from the surface of the base 2 to the raised position shown in FIGS. 2 and 5. In some embodiments, an airbag deployment trigger 14 may operably engage the air canisters 9 to facilitate instant discharge of compressed air from the air canister or air canisters 9 into the air bag or air bags 10 to inflate the air bag or air bags 10, as shown in FIGS. 2 and 5, upon manual activation or manipulation of the trigger 14.

In an exemplary application, the vehicle stop device 1 may be used to stop a vehicle (not shown) as the vehicle flees from pursuing law enforcement during a car chase. Accordingly, the vehicle stop device 1 may be placed across a roadway (not shown) ahead of a fleeing vehicle such as by rolling the wheels 4 on the roadway surface 26 (FIG. 5). As the vehicle approaches and then drives over the vehicle stop device 1, the airbag deployment trigger 14 may be manually actuated to facilitate instant discharge of compressed air from the air canister or air canisters 9 into the air bag or air bags 10. Accordingly, the rapidly-inflating air bag or air bags 10 lift(s) the deck 18 from the flat configuration shown in FIGS. 1, 3 and 4 to the raised position shown in FIGS. 2 and 5. Therefore, as shown in FIG. 5, the rapidly-rising deck 18 engages and lifts the vehicle 24 from the roadway surface 26. The vehicle stop device 1 with the vehicle 26 supported thereon coasts to a stop on the roadway surface 26 and the operator (not shown) of the vehicle 24 may be apprehended.

Figure 6:
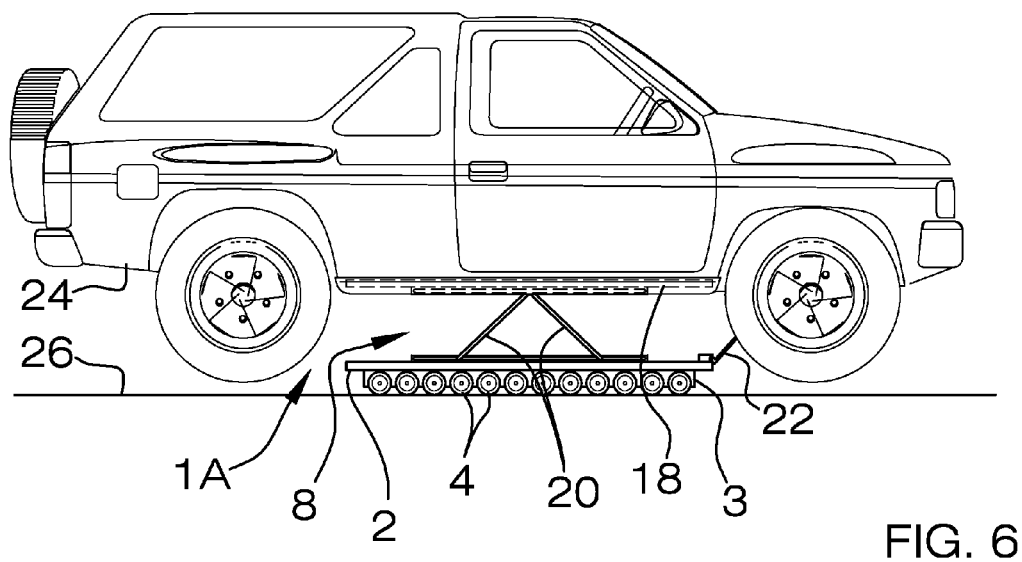
FIG. 6 is a side view of an alternative illustrative embodiment of the vehicle stop device, shown in the extended configuration and raising a vehicle.

Referring to FIG. 6, an alternative illustrative embodiment of the vehicle stop device is generally indicated by reference numeral 1*a*. The lift system 8 of the road stop device 1*a* may include a hinged spring 20 which is provided on the base 2. The deck 18 is provided on the hinged spring 20. A spring deployment trigger 22 may operably engage the hinged spring 20 to facilitate selective extension of the hinged spring 20 from a flat position (not shown) in which the hinged spring 20 lies flat on the base 2 and the deployed or extended position shown in FIG. 6 in which the hinged spring 20 raises the deck 18 from the surface of the base 2, responsive to typically manual activation or manipulation of the airbag deployment trigger 14. Use of the vehicle stop device 1*a* may be as was heretofore described with respect to the vehicle stop device 1 in FIGS. 1-5.

What is claimed is:

1. A vehicle stop device, comprising:
   a plurality of wheels;
   a generally flat base carried by said plurality of wheels;
   a lift system carried by said base; and
   a generally flat deck carried by said lift system said lift system comprises a pair of hinged springs carried by said base and wherein said deck is carried by said pair of hinged springs.

2. The vehicle stop device of claim 1 further comprising at least one wheel rail carried by said base and wherein said plurality of wheels is carried by said at least one wheel rail.

3. The vehicle stop device of claim 2, wherein said at least one wheel rail comprises a pair of wheel rails carried by said base in generally parallel, spaced-apart relationship with respect to each other and wherein said plurality of wheels is carried by said pair of wheel rails, respectively.

4. The vehicle stop device of claim 1 wherein said lift system comprises at least one air canister carried by said base and at least one airbag carried by said base and disposed in pneumatic communication with said at least one air canister, and wherein said deck is carried by said airbag.

5. The vehicle stop device of claim 4 further comprising an airbag deployment trigger engaging said at least one air canister.

6. The vehicle stop device of claim 1 further comprising a spring deployment trigger engaging said pair of hinged springs.

\* \* \* \* \*